US012771685B2

(12) United States Patent
Garg et al.

(10) Patent No.: US 12,771,685 B2
(45) Date of Patent: Oct. 20, 2026

(54) PLUGIN AUTHORIZATION WORKFLOW FOR WEB APPLICATIONS

(71) Applicant: Adobe Inc., San Jose, CA (US)

(72) Inventors: Tarun Garg, New Delhi (IN); Abhishek Das, Kolkata (IN)

(73) Assignee: Adobe Inc., San Jose, CA (US)

( * ) Notice: Subject to any disclaimer, the term of this patent is extended or adjusted under 35 U.S.C. 154(b) by 343 days.

(21) Appl. No.: 18/140,700

(22) Filed: Apr. 28, 2023

(65) Prior Publication Data

US 2024/0364683 A1 Oct. 31, 2024

(51) Int. Cl.
*H04L 9/40* (2022.01)

(52) U.S. Cl.
CPC ...... *H04L 63/0853* (2013.01); *H04L 63/0807* (2013.01)

(58) Field of Classification Search
CPC .. H04L 63/08; H04L 63/0807; H04L 63/0853
See application file for complete search history.

(56) References Cited

U.S. PATENT DOCUMENTS

2014/0189808 A1* 7/2014 Mahaffey ............ G06F 21/6245 726/4
2015/0281318 A1* 10/2015 Warner .................. H04L 67/02 709/217
2019/0222424 A1* 7/2019 Lindemann ........... H04L 9/3231
2020/0162454 A1* 5/2020 Jain ........................ G06F 21/335
2021/0011742 A1* 1/2021 Ganchev ................. G06F 9/452
2021/0120417 A1* 4/2021 Sundar .................. H04L 63/126
2021/0234850 A1* 7/2021 Vogt ...................... H04W 12/06
2022/0224535 A1* 7/2022 Coffing ................. H04L 63/205
2022/0271935 A1* 8/2022 Bhasin ..................... G06F 21/33
2023/0107925 A1* 4/2023 Collver ............... G06F 16/2455 707/718
2023/0155812 A1* 5/2023 Bennison .............. H04L 9/0861 713/171
2023/0370470 A1* 11/2023 Gupta ..................... H04L 63/20

FOREIGN PATENT DOCUMENTS

WO WO-2022040441 A1 * 2/2022 ............ G06F 21/31

* cited by examiner

*Primary Examiner* — Trong H Nguyen
*Assistant Examiner* — Ayub A Maye
(74) *Attorney, Agent, or Firm* — FIG. 1 Patents

(57) ABSTRACT

A plugin authorization workflow for web applications is described. A plugin makes a request for an authorization token. An authorization provider module receives the request and displays a user interface (UI) to receive an input for approving execution of the plugin. A target authorization system receives the approval and generates an authorization code which is communicated to the authorization provider module and back to the plugin. The plugin directly calls the target authorization system with the authorization code. In return, the target authorization system sends an authorization token back to the plugin allowing execution of the plugin.

20 Claims, 10 Drawing Sheets

PLUGIN AUTHORIZATION WORKFLOW FOR WEB APPLICATIONS

BACKGROUND

Web applications have been developed to support functionality in a cloud-based environment. Examples of web applications include office tools such as spreadsheets and word processors, design tools such as computer aided design (CAD) tools, drawing tools, and photo and video editing tools, and so on.

Plugins have been developed to expand functionality and usefulness of web applications. Conventional techniques used to authorize plugins for use as part of web applications, however, expose the web applications to potentially malicious behavior. Conventional techniques, for instance, disrupt behavior of the web application and limit an ability to incorporate the plugin as part of the web applications, which hinders functionality of the web applications, computing devices that implement the web applications, and so on.

SUMMARY

A plugin authorization workflow for web applications is described. To do so in one example, a plugin makes a request for an authorization token. An authorization provider module receives the request and displays a user interface (UI) to receive an input for approving execution of the plugin. A target authorization system receives the approval and generates an authorization code which is communicated to the authorization provider module and back to the plugin. The plugin directly calls the target authorization system with the authorization code. In return, the target authorization system sends an authorization token back to the plugin allowing execution of the plugin.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
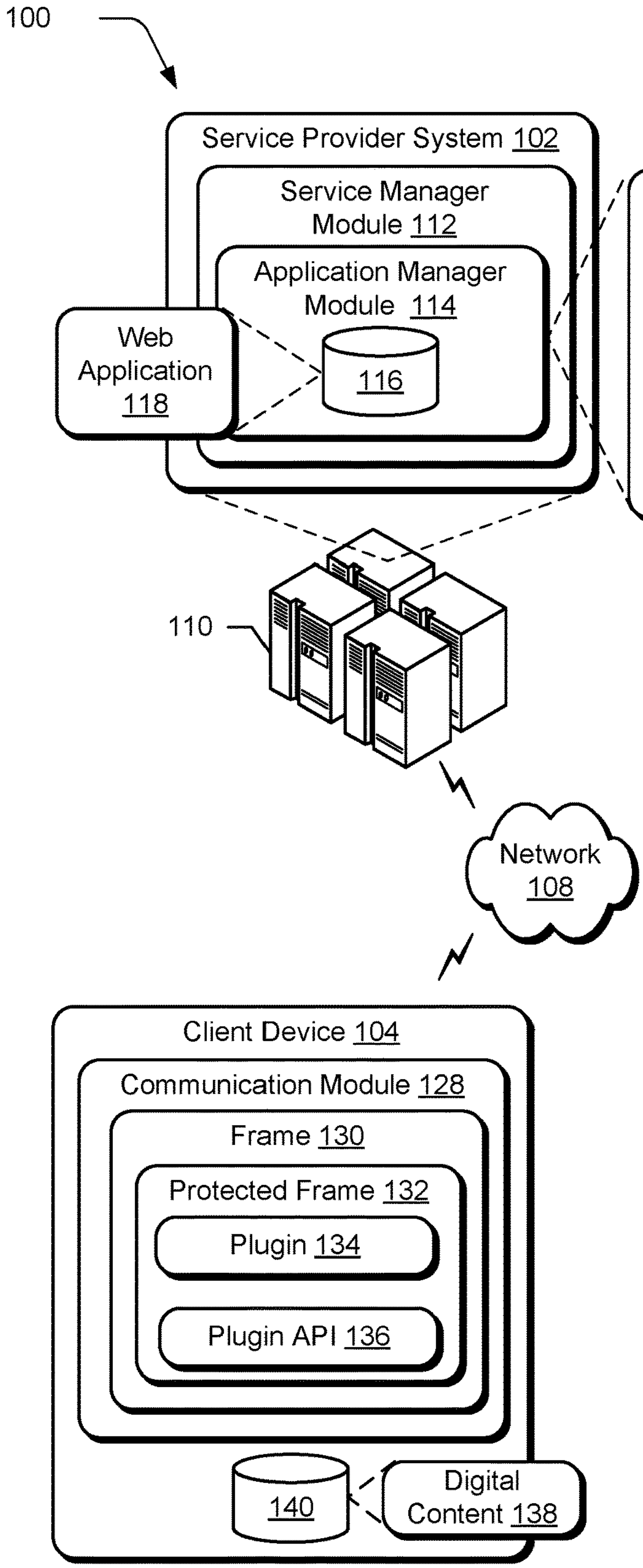
FIG. 1 is an illustration of an environment in an example implementation that is operable to employ plugin authorization workflows described herein.

Plugins (i.e., plugin modules) are employed by web applications (e.g., browsers, network-enabled applications) as a straightforward way to expand functionality available via the web applications to enrich a user's experience. Examples of the use of plugins include provisioning of additional functions, components, tools, or additional content as part of a web application. In a first example of a conventional technique, plugins are embedded into an existing web page. However, such a simplistic embedding does not support control over operation of the plugin. Consequently, the plugin may cause output of a popup menu, resize windows, or cause unauthorized use of other applications such as video players, etc. Thus, this lack of control is exploitable by malicious parties.

In a second example, plugins are implemented as an inline frame (iframe). An iframe is a web page element configured to load another HTML element into the web page. In this way, the iframe provides a mechanism to embed content or functionality of a plugin into an existing web page. The iframe is also used to provide separation between execution of the web application and execution of the plugin. The iframe, for instance, is usable to restrict access by framed content within the iframe to a web application's domain or data that is stored locally. As well, the iframe is also configured to restrict embedded content from arbitrarily editing other portions on a web page but rather is limited to edits within the iframe's outline. However, separation provided by the iframe is not suitably robust in some real world situations because various types of malicious behavior by the plugin are still possible like unwanted autoplaying of videos and popups within the iframe as well as others.

For added control, a "sandbox attribute" is added to the iframe. The sandbox attribute limits execution of the plugin within the iframe as described above. This ability supports greater control by the web application and helps to avoid risks from malicious parties. For example, in the iframe example given above, addition of the sandbox attribute has the capability to prevent malicious autoplaying of videos and malicious popups.

Conventional techniques used to implement sandbox attribute of the iframe, however, often impede an ability for a plugin to receive authorizations in a conventional authorization workflow in real world scenarios. For example, plugin developers wishing to implement a plugin for the web application are not able to implement a conventional authorization process. This is because the restrictions imposed by the sandboxed iframe prevent conventional authorization processes due to conventional limitations of execution within the sandboxed iframe. To address this in conventional techniques, plugin developers are tasked with creating a dedicated backend authorization service.

To address these technical challenges, an authorization workflow is described that supports execution of a plugin in conjunction with a web application. The authorization workflow provides a plugin with an application programming interface (API) as part of the plugin software development kit (SDK). The software development kit is usable to integrate the API into a corresponding plugin. The API supports output of a user interface (UI) to the authorization workflow to support user authentication via a user interface, e.g., by supplying a username and password.

The API then sends the authorization request to a target authorization system where the plugin has been registered as an authorized plugin. If the plugin has been registered with the target authorization system and the authorization request identifies the plugin as the registered plugin, the target authorization system returns an authorization code to the plugin via a redirect web application. The redirect web application is added to the web application to ensure that the authorization code is sent back to the plugin and not to a malicious server. Once the plugin receives the authorization code, the plugin requests an authorization token, using the authorization code, directly from the authorization system. When the plugin is run and it has already obtained the authorization token, the token is passed to the web application in a request header authorization which allows its use by the web application.

Generally, the authorization code is obtained by using the target authorization system as an intermediary between the client and the plugin developer. The plugin developer preregisters the plugin with the target authorization system. Instead of requesting authorization directly from the plugin developer, the client is directed to the target authorization system by the web application, which sends the authorization code back to the client. Because the plugin is limited to authentication with the target authorization system, the plugin developer's credentials are not shared with the client. With the authorization code, the plugin then requests the authorization token directly from the target authorization system. The authorization code provides security benefits, such as the ability to authenticate the client, as well as the transmission of the access token directly to the client without passing it through the web application and potentially exposing it to others.

Using this framework, the plugin developer is not tasked with creating its own backend authorization workflow. Rather, the developer leverages the plugin API which is part of the web application's SDK. Systems and processes for carrying out the authorization workflow using the plugin API and the redirect web application are described in greater detail below.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ plugin authorization workflow techniques described herein. The illustrated digital medium environment 100 includes a service provider system 102, a client device 104, and a target system 106 that are communicatively coupled, one to another, via a network 108. Computing devices that implement the service provider system 102, the client device 104, and the target system 106 may be configured in a variety of ways.

A computing device, for instance, may be configured as a desktop computer, a laptop computer, a mobile device (e.g., assuming a handheld configuration such as a tablet or mobile phone), and so forth. Thus, computing devices may range from full resource devices with substantial memory and processor resources (e.g., personal computers, game consoles) to a low-resource device with limited memory and/or processing resources (e.g., mobile devices). Additionally, although a single computing device is shown in some instances, a computing device may be representative of a plurality of different devices, such as multiple servers 110 utilized by many to perform operations "over the cloud" by running containers or virtual machines.

The service provider system 102 includes a service manager module 112 configurable to coordinate services executed by the service provider system 102. One such service executed by the service provider system 102 is illustrated as an application manager module 114. The application manager module 114 is representative of functionality to retrieve and manage execution of a web application 118 from a storage medium 116. The web application 118 is configurable as any of a variety of web applications such as but not limited to word processors, design and drawing tools, photo and video editing tools, sound editing tools, communications platforms, shopping carts, social networking apps, file conversion tools, file scanning apps, email programs, etc.

The application manager module 114 also includes an authorization management system 120. The authorization management system 120 is configured to coordinate an authorization process for plugins (e.g., add-ons) to the web application 118. The authorization management system 120, as illustrated, includes an authorization provider API 122, an authorization provider module 124, and an authorization redirect application 126. The authorization management system 120 is utilized as part of the plugin authorization workflow in support of simplifying authorization of plugins (e.g., addons and applications from third parties) that are to be embedded in the web application 118.

The client device 104 is representative of a computing device which as stated above is configurable in any of a variety of forms including, but not limited to personal, desktop, and mobile computing devices. The client device 104 includes a communication module 128 which is representative of functionality to support wired or wireless connections that are configured to provide communications between the client device 104 and other devices communicating over the network 108. A frame 130 is representative of a web browser window or other application for accessing the web application 118. A protected frame 132 is embedded in the frame 130 which is configurable, but is not limited to, an iframe as described above.

The authorization provider API 122 provides a user interface, via which, inputs are received for registration of plugins. The authorization provider module 124, in one or more examples, is provided as part of a plugin SDK and is configurable to include, among other elements, a plugin API that provides plugin data and receives login information as part of the plugin authorization workflow. The authorization redirect application 126 is configured to be embedded in web application 118 in support of uniform resource locator (URL) redirection of authorization codes. The authorization redirect application is configured to aid in preventing redirection attacks and other malicious redirection behavior because the authorization code is provided to the plugin.

The protected frame 132 supports sandbox attributes. The sandbox attributes are configured to restrict execution of the plugin 134 by the client device 104 within the web application 118. A plugin API 136 is provided with a plugin SDK. The plugin API 136 is configured to request an authorization code. In accordance with various illustrative examples, the plugin API 136 specifies any of, but not limited to, a target authorization URL, an authorization type (e.g., Plain, PKCE, Secret, etc.), a client ID, a response type (e.g., authorization code), scope (additional access requested by the plugin), or a challenger code. Once the plugin 134 is authorized in the authorization process described herein, digital content 138 is used by web application 118 and plugin 134, the digital content residing in a storage medium 140 which is local or remote.

As part of the plugin authorization workflow, the plugin API 136 is configured to request authorization from a target authorization system 150 to verify the pre-registration of the plugin with the target authorization system 150 and to allow use of the plugin with the web application 118. The target authorization system 150 includes a plugin manager module 152 which is configured to manage the registration of plugins for the web application 118. The target authorization system 150 also includes a target authorization module 154 configurable to control the sending and receiving of authorization codes 156, check for acceptance or rejection of authorization requests, and send and receive authorization tokens 158. The authorization codes 156 and authorization tokens 158 are stored and retrieved from a storage medium 160 which are local or remote. Further discussion of these and other examples are included in the following section and shown in corresponding figures.

Generally, in operation, the web application 118 (e.g., executing on the servers 110 and within the frame 130 of the client device 104), initiates execution of the plugin 134 within the protected frame 132. The plugin API 136 sends an authorization request to the target authorization module 154 of the target authorization system 150. Upon approval, the target authorization module 154 returns the authorization code 156 to the authorization redirect application 126 which assures that the authorization code 156 is sent to plugin 134. The plugin 134 sends the authorization code 156 directly to the target authorization module 154 which returns the authorization token 158 directly back to plugin 134 so that the plugin 134 is authorized for operation within the frame 130 embedded in the web application 118. In this way, the plugin authorization workflow avoids the third-party development of backend authorization processes for each plugin, which is discussed with reference to the additional figures and described in more detail herein, so that third-party developed plugins can be used with web applications with much greater security without adding plugin development complexity.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Authorization Code Request

Figure 2:
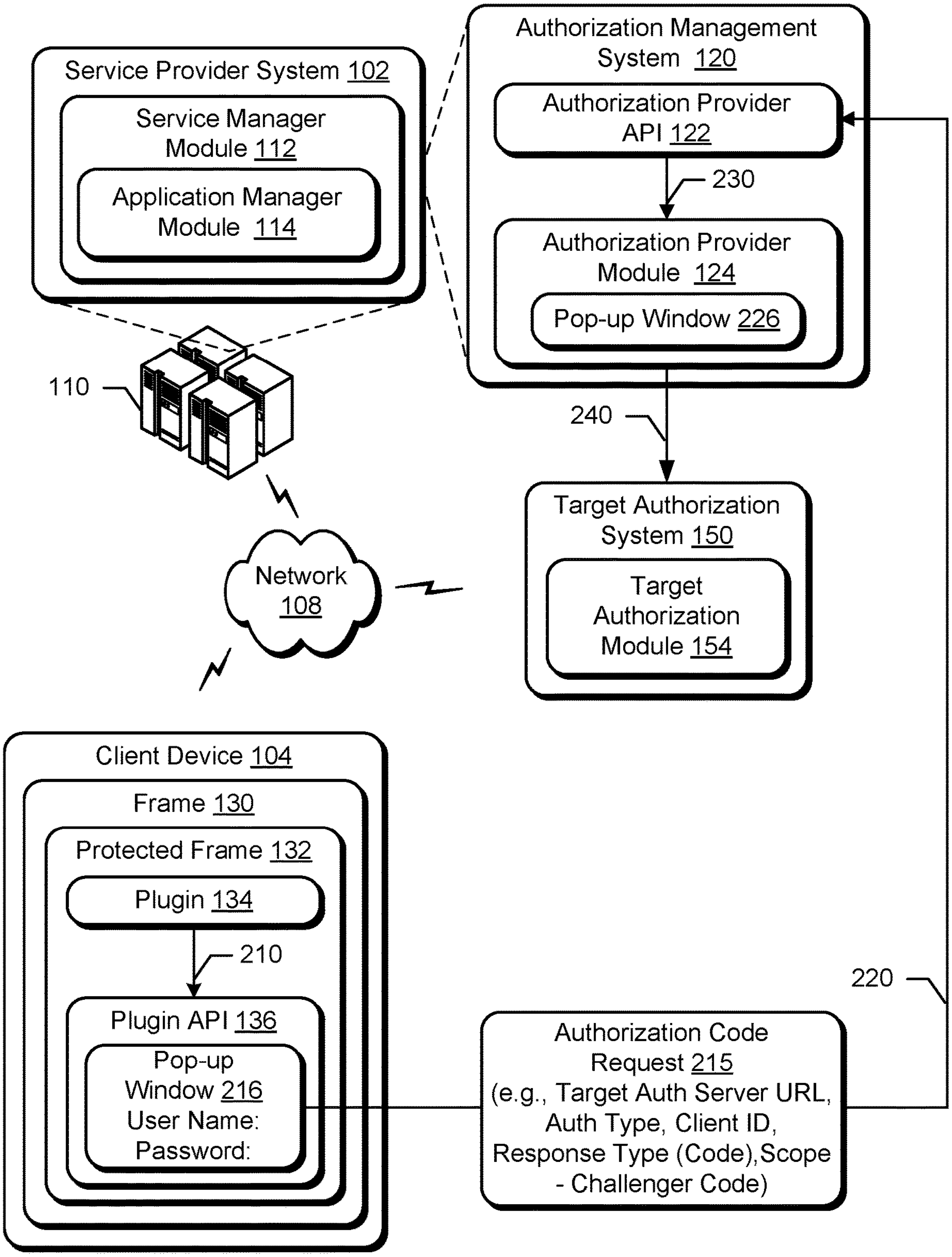
FIG. 2 depicts an example implementation of an authorization code request process executed within the example environment of FIG. 1.

FIG. 2 depicts a sub-process of the web application plugin authorization process in accordance with an illustrative example. The sub-process depicted is an authorization code request process which is part of the overall plugin authorization workflow. In some examples, the plugin SDK for the web application 118 supports OAuth 2.0 PKCE authorization however, other known and to be developed authorization algorithms are also usable. The illustrated sub-process begins with the plugin 134, which is executed within the protected frame 132. The plugin 134 initiates an authorization request (arrow 210) via the plugin API 136.

The protected frame 132, is configurable as an iframe with sandbox attributes embedded in the web application 118. The plugin 134 is developed, at least in part, using a software development kit (SDK) provided by the web application 118. The SDK defines a plugin API 136. Prior to first use, plugin 134 registers with the target authorization system 150 using the authorization redirect application 126. As the plugin 134 is loaded, a pop-up window 216 is output that is configured to receive user credentials using the plugin API 136. The plugin API 136 is used to check whether the plugin 134 is already authorized for use. If the plugin 134 is not authorized, the plugin API 136 issues a call-to-action in the pop-up window 216, such as but not limited to an offer to setup an account, payment of a license fee, and so forth.

Upon verification of registration of the plugin 134, the plugin 134 is executed to generate an authorization code request 215 configured to request an authorization code using the plugin API 136. The authorization code request 215, for instance, is configurable to include a target authorization system uniform resource locator (URL), an authorization type (e.g., Plain, PKCE, secret, etc.), a client identifier (ID), a response type (e.g., code), a scope (e.g., additional access requested by the plugin 134), a challenger code, and so on.

The plugin API 136 is configured to send the authorization code request 215 to an authorization provider API 122 (arrow 220) of the authorization management system 120. The authorization provider API 122 is used to pass the authorization code request 215 to an authorization provider module 124 (arrow 230). In response, the authorization provider module 124 generates a pop-up window 226, e.g., for communication back to the client device 104. The pop-up window 226 is configured to receive inputs to approve the request, e.g., which is performed upon receipt of user credentials as part of a login. The authorization provider module 124, upon receipt of the user credentials, directs the authorization code request to a URL of a target authorization module 154 (arrow 240) of the authorization system 150. The target authorization system 150 processes the authorization code request 215 and approves or rejects the request.

Authorization Code Redirect

Figure 3:
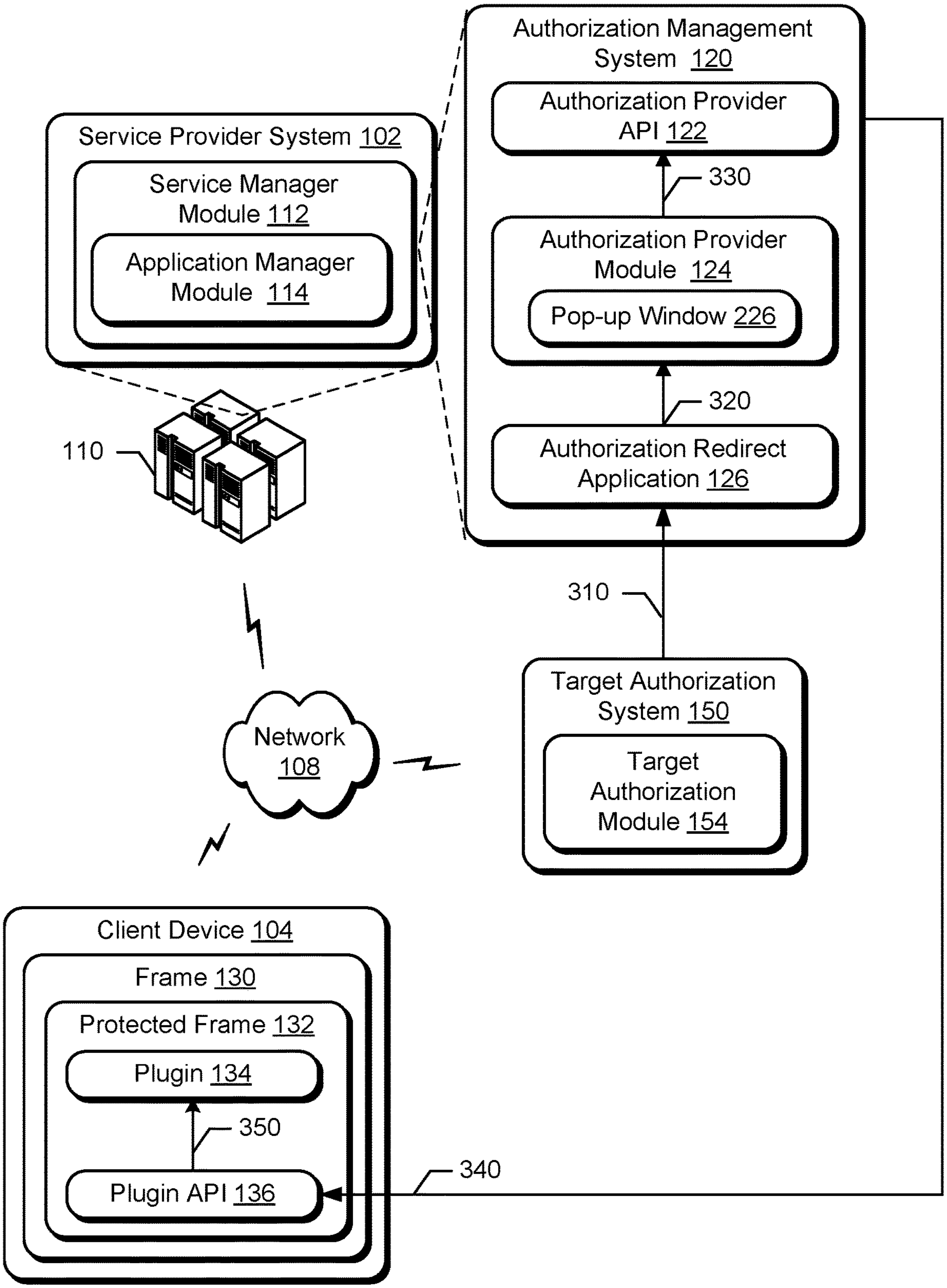
FIG. 3 depicts an example implementation of an authorization code redirect process executed within the example environment of FIG. 1.

FIG. 3 depicts an authorization code redirect sub-process of the web application plugin authorization process in accordance with an illustrative example. If the authorization code request 215 is approved by the target authorization system 150, an authorization code redirect sub-process depicted in FIG. 3 begins by the target authorization module 154 of the target authorization system 150 sending the authorization code and authorization state to an authorization redirect application 126 (arrow 310).

The authorization redirect application 126 is configured to avoid malicious behavior, such as but not limited to open redirection attacks, which can be used to redirect the authorization code to a malicious URL. The authorization redirect application 126 sends the authorization code to the authorization provider module 124 (arrow 320) which in turn passes the authorization code to the authorization provider API 122 (arrow 330). The authorization provider API 122 sends the authorization code to the plugin API 136 (arrow 340) and to the plugin 134 (arrow 350).

Authorization Token Request

Figure 4:
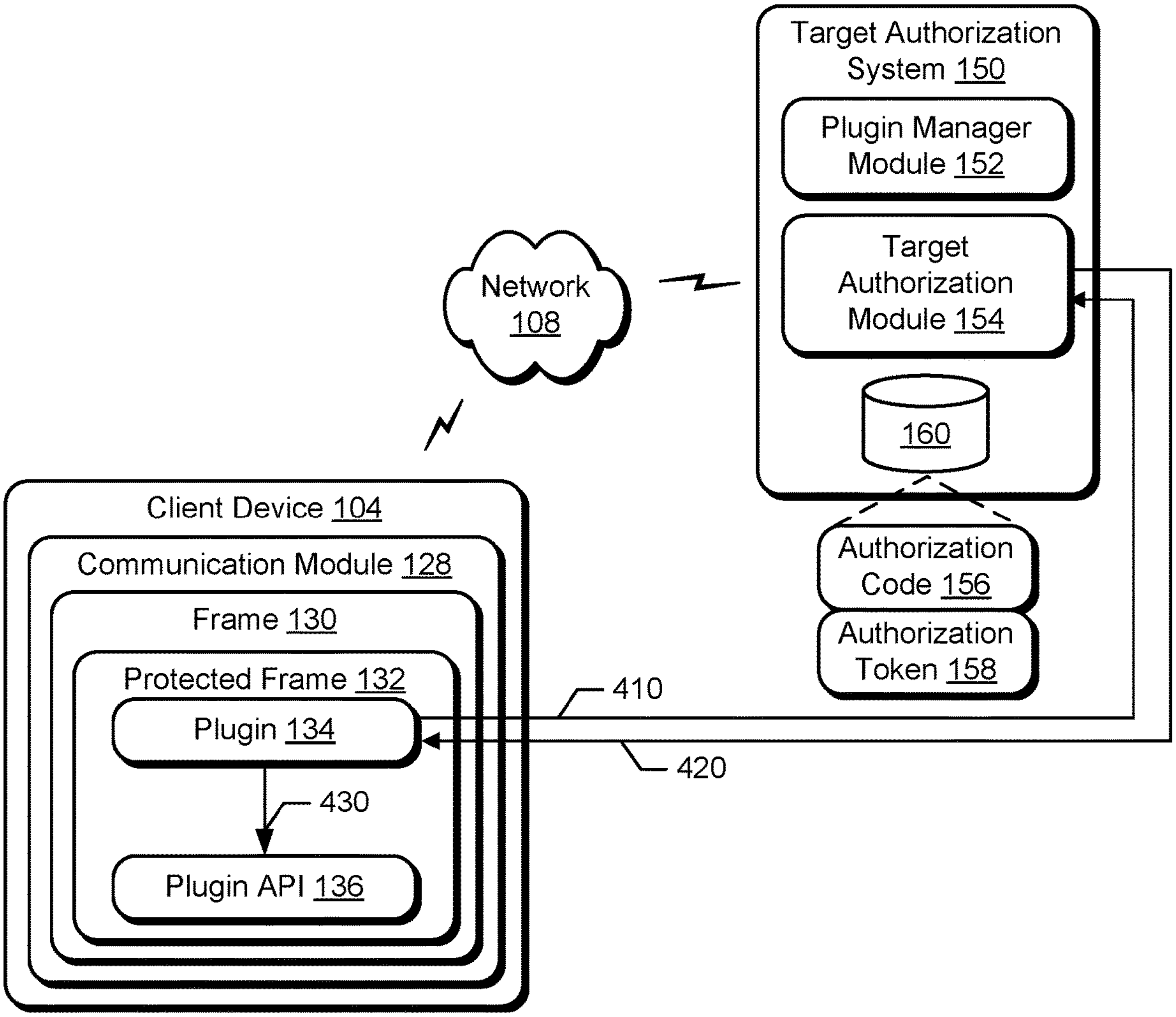
FIG. 4 depicts an example implementation of an authorization token request and receive process executed within the example environment of FIG. 1.

FIG. 4 depicts an authorization token request sub-process of the web application plugin authorization process in accordance with illustrative examples. Once the plugin 134 has received the authorization code, the plugin 134 sends a request for an authorization token with the authorization code directly to the target authorization module 154 (arrow 410) of target authorization system 150. The target authorization system 150 identifies the authorization code as valid, and in response, sends back the associated authorization token directly by HTTP service (arrow 420). The plugin 134 then sends the authorization token to the plugin API 136 (arrow 430) which includes functionality for storing the authorization token. The plugin 134 then uses the plugin API 136 to selectively retrieve the authorization token whenever the plugin 134 is to be used with the web application 118.

Plugin Authorization Process

Figure 5:
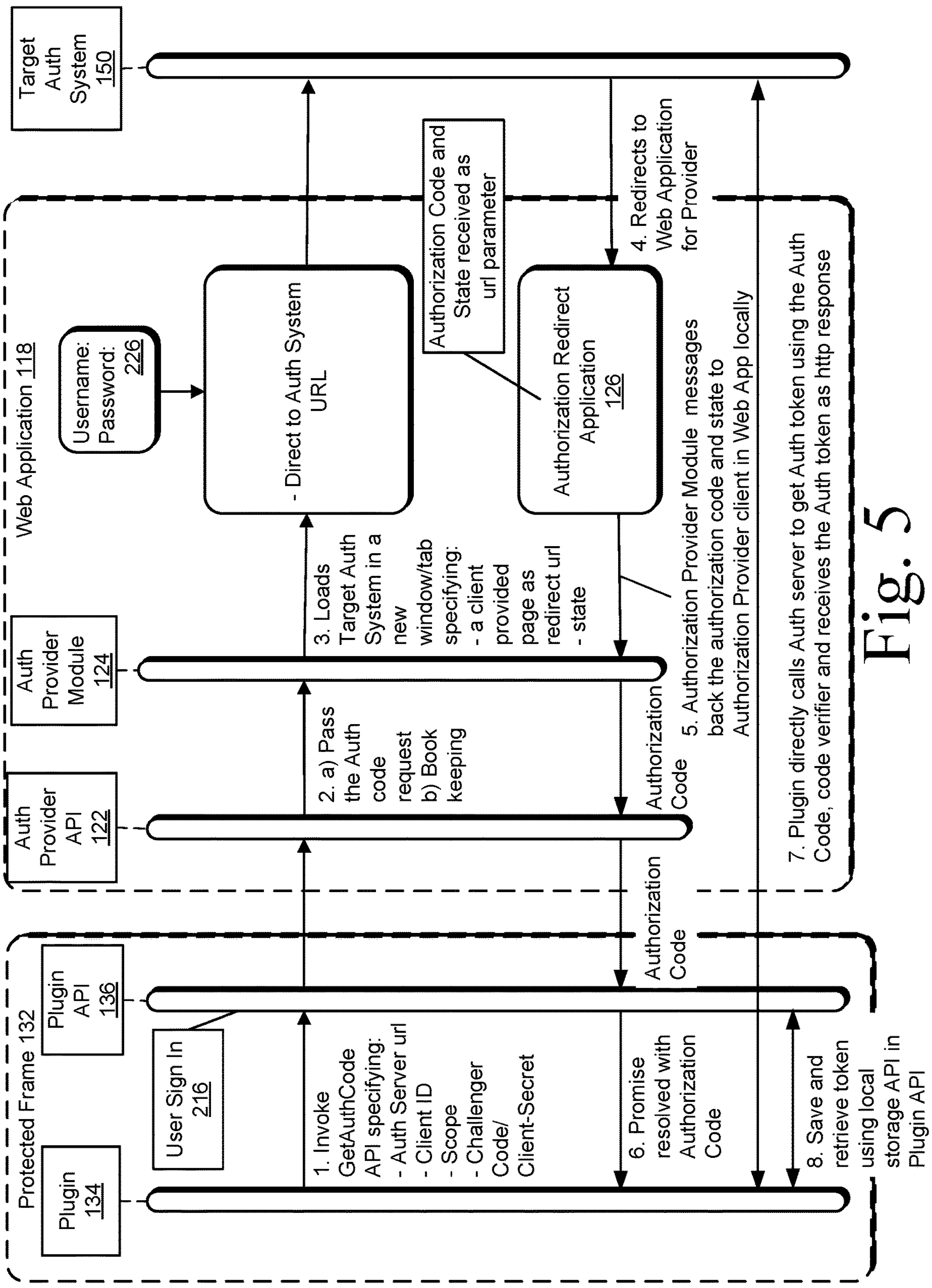
FIG. 5 depicts an example implementation of a web application plugin authorization process.

FIG. 5 depicts the plugin authorization process as exemplified in FIGS. 2-4. The example plugin authorization process depicted and described is a variation of an OAuth workflow in part with the addition of the functionality of the plugin API 136, the authorization provider module 124 and authorization provider API 122, and the authorization redirect application 126. The addition of these functional elements provides the ability for a uniform implementation of plugins 134 such that plugin developers are not tasked with creating their own back-end authorization service to circumvent any restrictions imposed by the protected frame 132. Other authorization workflows may be used and similarly adapted for the restrictions imposed by protected frame 132 such as but not limited to MIRACL, Fusion Auth, and so on. Plugins 134 include any of a variety of programs and are sometimes referred to as add-ons and add-on programs. Various types of code structures and challenge codes can be used without departing from the scope of the disclosure.

User Interfaces

Figure 6:
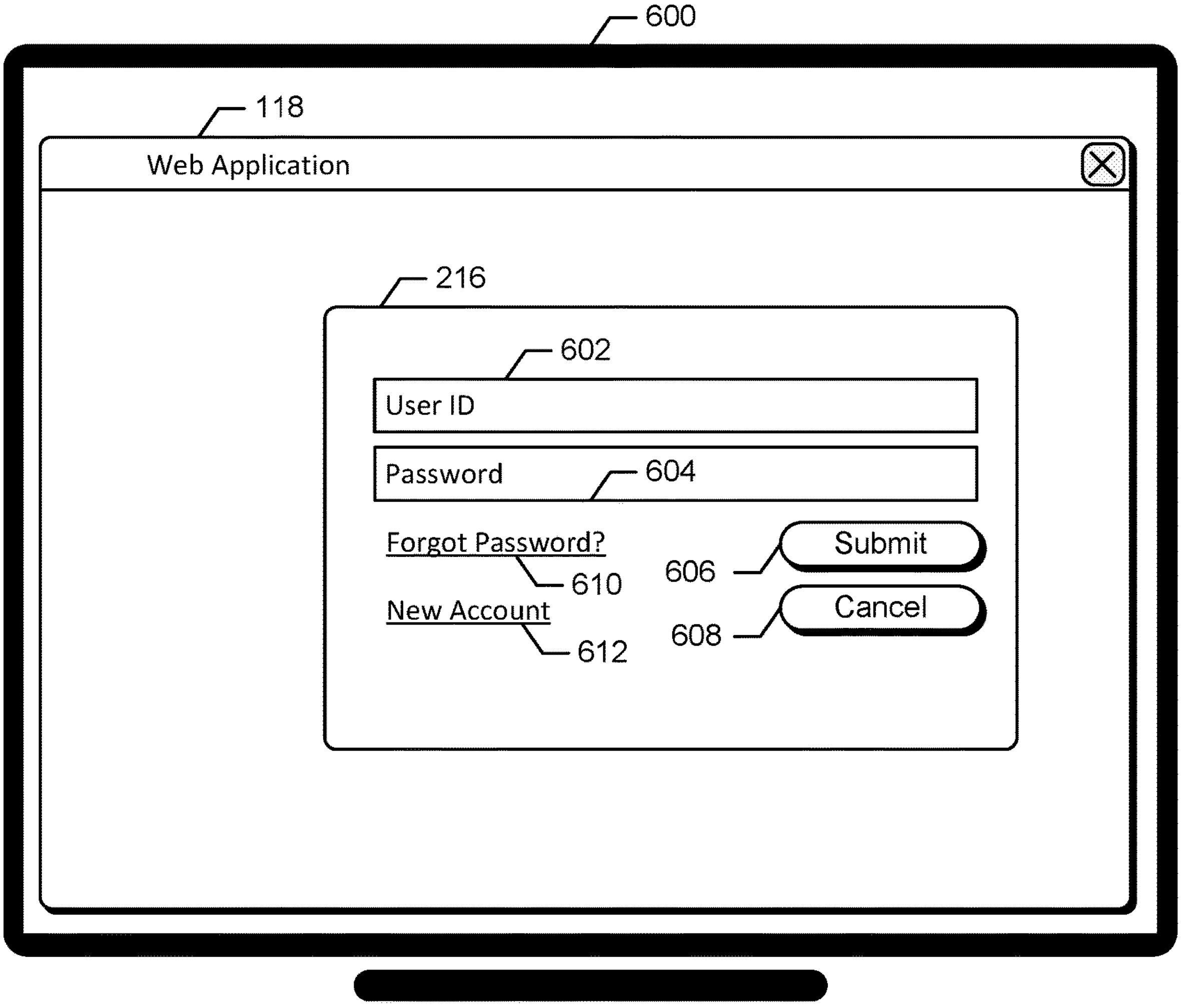
FIG. 6 depicts an example user interface associated with the plugin user account.

FIG. 6 depicts an example user interface (UI) displayed on a display device 600 of the client device 104. The UI includes the web application 118. During the web application plugin authorization process, the pop-up window 216 includes a user identification input field 602 and a password input field 604 for logging into the user's account with the plugin provider. A submit button 606 and a cancel button 608 are provided for continuing the login process (using the submit button 606) or ending the login process (using the cancel button 608), respectively. A Forgot Password link 610 is provided for the case in which the user decides to change the password because it was forgotten or has become inadvertently known by others. A New Account link 612 is used if the user does not yet have an account with the plugin provider.

The pop-up window 226 appears similar to the depicted pop-up window 216 but allows users to log into the web application provider account to approve the authorization request. The UI depicted on the display device 600 is an example of a user interface that may be used to carry out the login function. Other UI's with various looks, fields, and user interactive elements may be used without departing from the scope of the disclosure.

Plugin Authorization Processes

Figure 7:
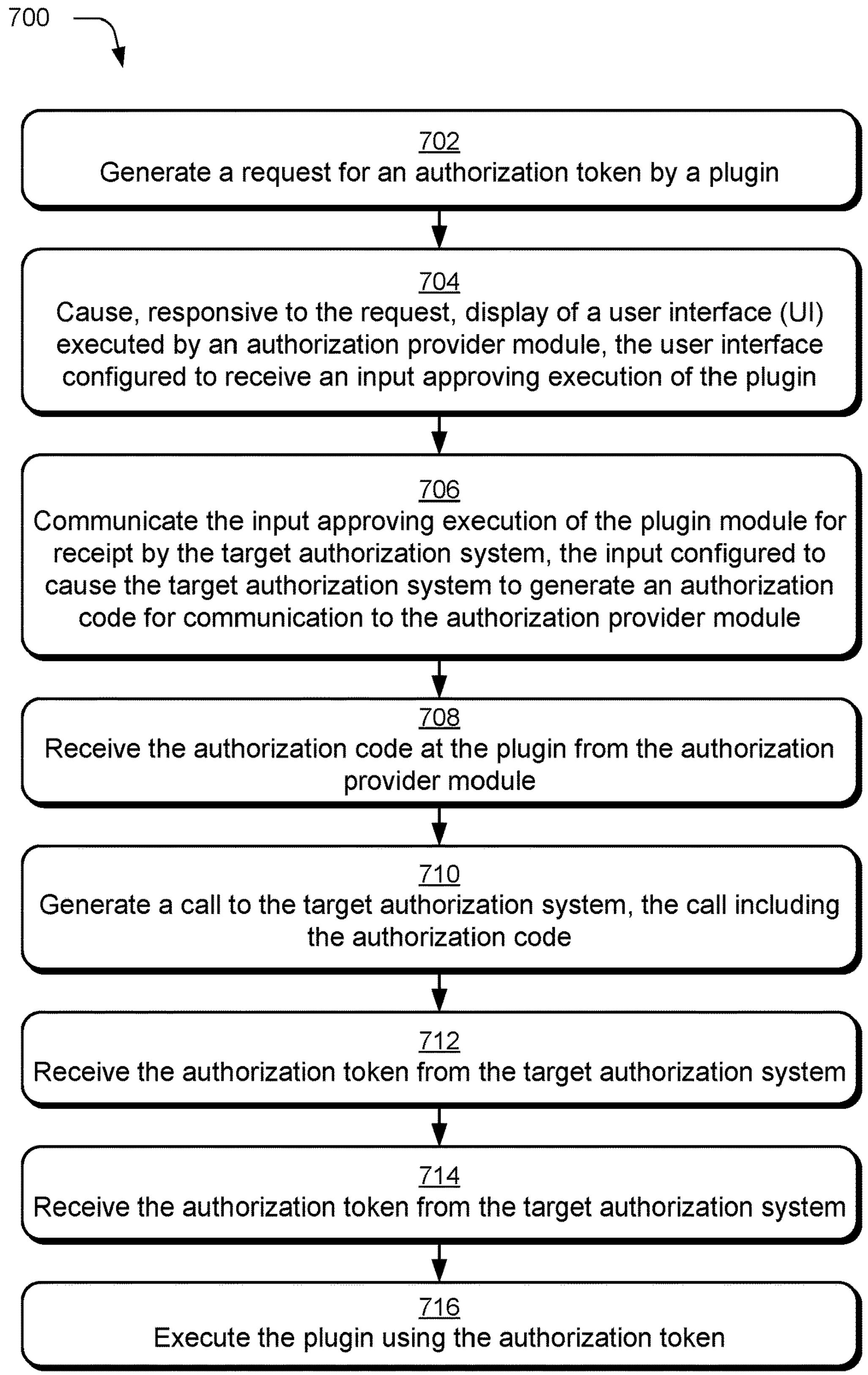
FIG. 7 is a flow diagram depicting a procedure in which a plugin requests an authorization token in accordance with an example implementation.

FIG. 7 depicts an example process 700 applied to authorization of a plugin for a web application. The plugin is executed in a protected frame such as but not limited to an iframe and in some examples a sandboxed iframe. The process 700 starts by generating a request for an authorization token by a plugin (block 702). The plugin has been previously registered and is known by a target authorization system in this example. The process 700 also includes causing, responsive to the plugin request, display of a user interface (UI) executed by an authorization provider module, the user interface configured to receive an input approving execution of the plugin (block 704).

Further, the process 700 includes communicating, by the processing device, the input approving execution of the plugin for receipt by the target authorization system, the input configured to cause the target authorization system to generate an authorization code for communication to the authorization provider module (block 706). Once the authorization code is generated the process 700 proceeds by receiving the authorization code at the plugin from the authorization provider module (block 708).

At this point, the target authorization system identifies and approves the use of the pre-registered plugin and process 700 then proceeds by generating a call to the target authorization system. The call includes the authorization code (block 710). The call is performed directly to the target authorization system by HTTP request which returns with the authorization token. Process 700 then includes receiving the authorization token from the target authorization system (block 712).

At this point the use of the plugin has been fully authorized and the process 700 includes executing the plugin using the authorization token (block 714). In accordance with various illustrative examples the authorization token may be stored locally and accessed locally such that the plugin may then be repeatedly used, by the user as they access the web application.

Figure 8:
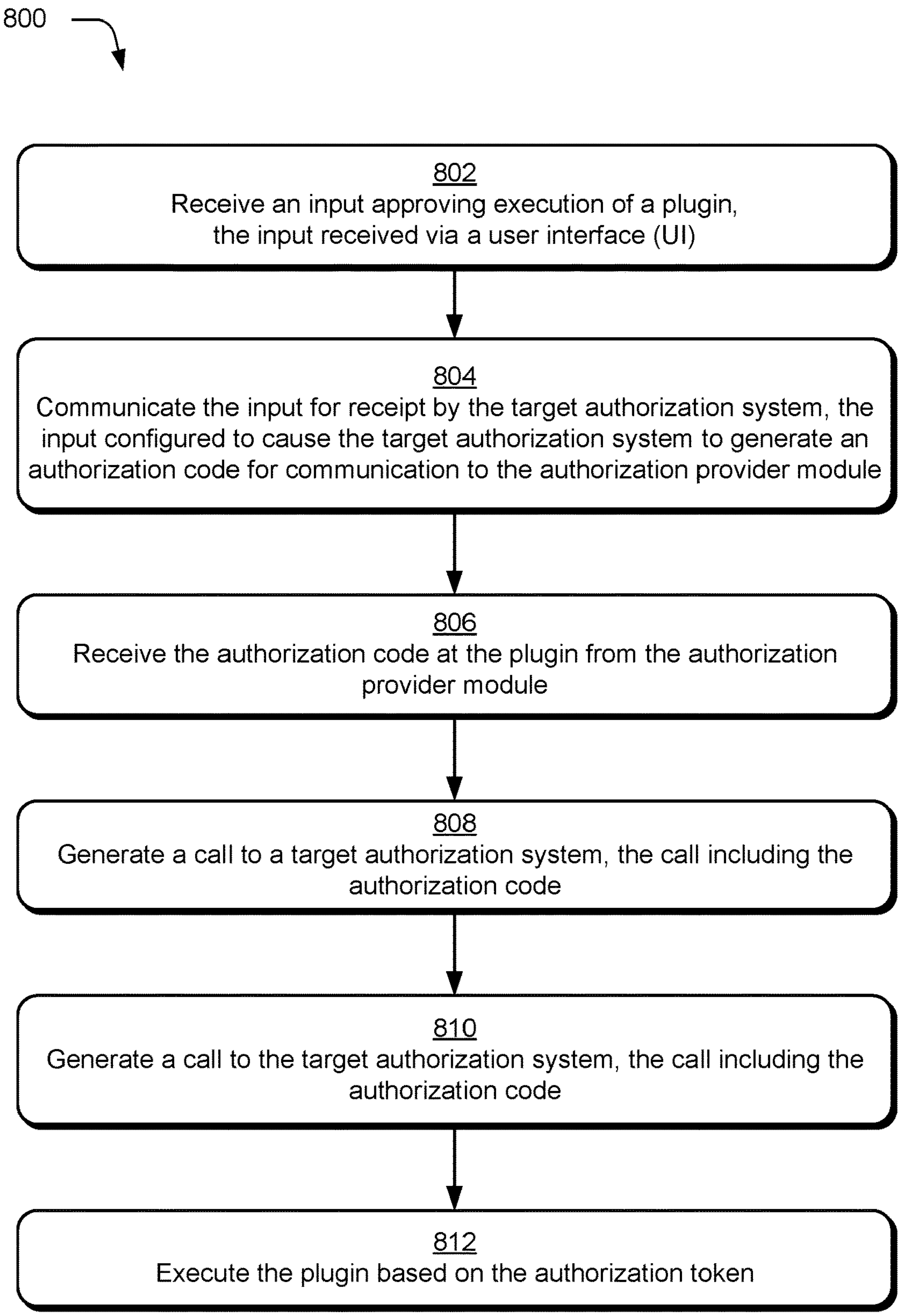
FIG. 8 depicts an example flow diagram depicting a procedure that is run on a processing device for approval of a prior registered plugin.

FIG. 8 depicts an example process 800 that is executed by a processing device for approval of a prior registered plugin for use with a web application in a protected frame. The process 800 includes receiving an input approving execution of a plugin, the input received via a user interface (block 802). The process 800 includes communicating the input for receipt by the target authorization system, the input configured to cause the target authorization system to generate an authorization code for communication to the authorization provider module (block 804).

The process 800 also includes receiving the authorization code at the plugin from the authorization provider module (block 806). Since the target authorization system has authorized use of the plugin, the plugin is not operable until it receives an authorization token. Process 800 further includes generating a call to a target authorization system, the call including the authorization code (block 808). The call is made directly from the plugin to the target authorization system and the process 800 still further includes receiving the authorization token from the target authorization system (block 810) and executing the plugin based on the authorization token (block 812).

Figure 9:
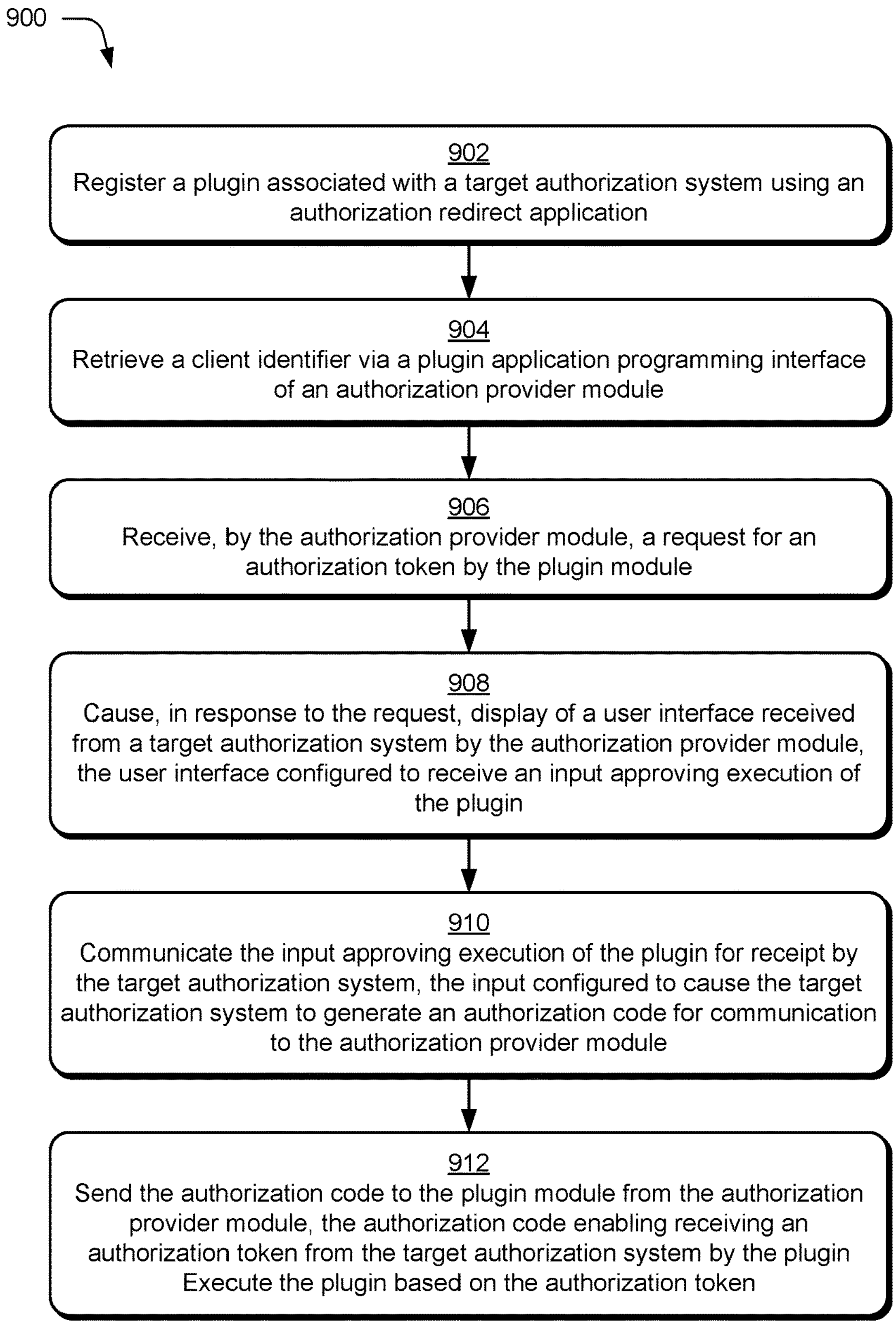
FIG. 9 depicts an example system having a series of executable instructions for the process approving use of a plugin for a web application.

FIG. 9 depicts a non-transitory computer-readable storage medium that stores executable instructions, which when executed by a processing device, cause the processing device to perform operations 900. The operations are carried out for the authorization of a plugin to a web application, the plugin being embedded in the web application in a protected frame. The operations include but are not limited to registering a plugin associated with a target authorization system using an authorization redirect application (block 902) and retrieving a client identifier via a plugin application programming interface of an authorization provider module (block 904).

The operations also include receiving, by the authorization provider module, a request for an authorization token by the plugin (block 906) and causing, in response to the request, display of a user interface received from a target authorization system by the authorization provider module, the user interface configured to receive an input approving execution of the plugin (block 908).

The operations further include communicating the input approving execution of the plugin for receipt by the target authorization system, the input configured to cause the target authorization system to generate an authorization code for communication to the authorization provider module (block 910) and sending the authorization code to the plugin from the authorization provider module, the authorization code enabling receiving an authorization token from the target authorization system by the plugin (block 912).

Example System and Device

Figure 10:
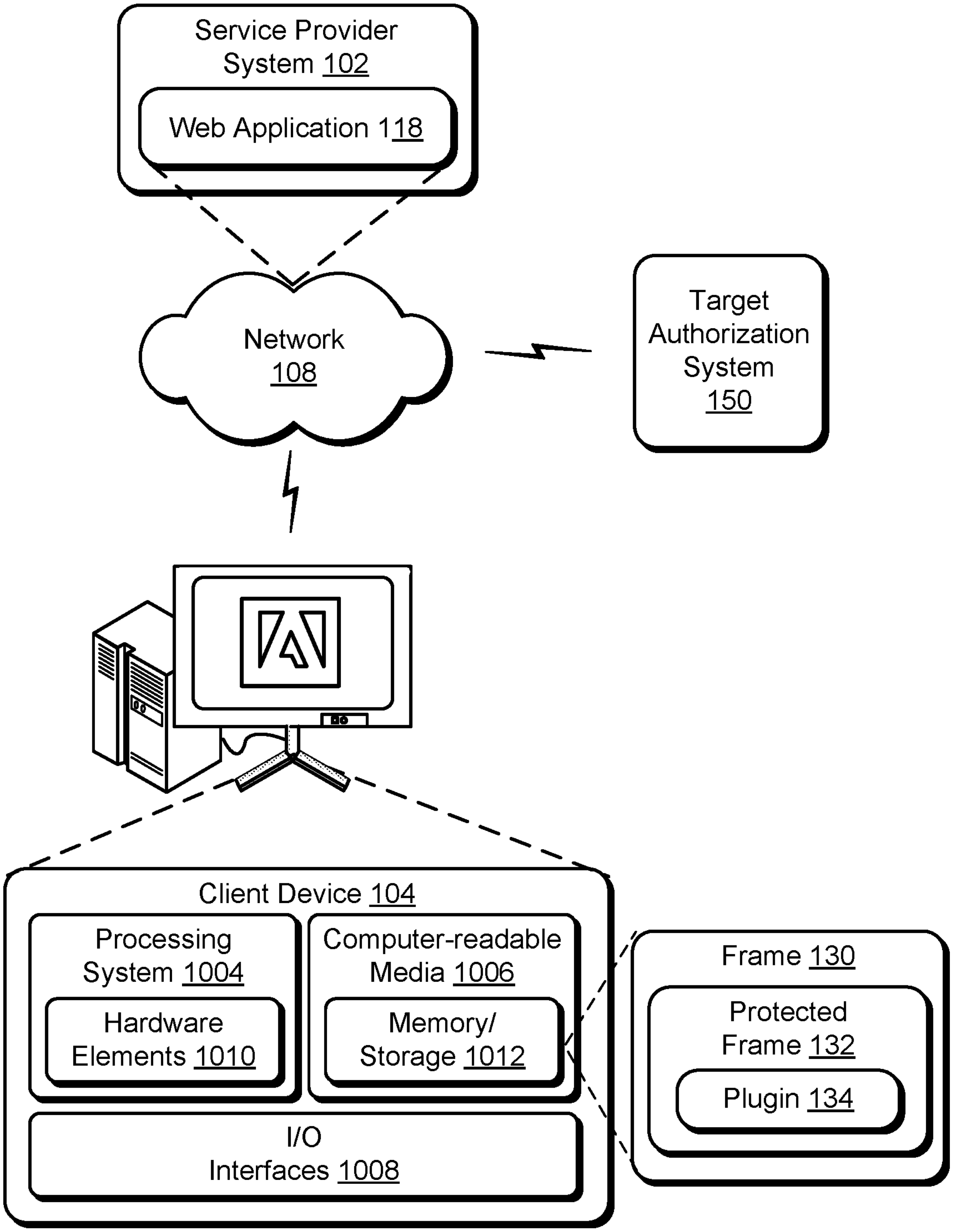
FIG. 10 illustrates an example system including various components of an example device that can be implemented as any type of computing device as described and/or utilize with reference to FIGS. 1-5 to implement various examples of the techniques described herein.

FIG. 10 illustrates an example system that includes an example computing device, client device 104 that is representative of one or more computing systems and/or devices that may implement the various techniques described herein. This is illustrated through inclusion of the browser which is an example implementation of frame 130. Frame 130 includes the protected frame 132 in which the plugin 134 is executed. The client device 104 may be, for example, a server of a service provider, a device associated with a client (e.g., a client device), an on-chip system, and/or any other suitable computing device or computing system. The target authorization system is also represented as a server in the cloud for authorizing plugins such as the plugin 134.

The example client device 104 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to client device 104, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the client device 104 is configurable in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the client device 104. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are configured to be accessed by a computer.

"Computer-readable signal media" may refer to a signal-bearing medium that is configured to transmit instructions to the hardware of the client device 104, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The client device 104 may be configured to implement particular instructions and/or functions corresponding to the software and/or hardware modules. Accordingly, implementation of a module that is executable by the client device 104 as software may be achieved at least partially in hardware, e.g., through use of computer-readable storage media and/or hardware elements 1010 of the processing system 1004. The instructions and/or functions may be executable/operable by one or more articles of manufacture (for example, one or more client devices 104 and/or processing systems 1004) to implement techniques, modules, and examples described herein.

The techniques described herein may be supported by various configurations of the client device 104 and are not limited to the specific examples of the techniques described herein. This functionality may also be implemented all or in part through use of a distributed system, such as over a "cloud" network 108 via a service provider system 102 as described below.

The service provider system 102 is configurable on any of a variety of servers, cloud servers, or the like running web application 118 and accessible over the network 108. The service provider system 102 abstracts underlying functionality of hardware (e.g., servers) and software resources of the network 108. The web application 118 may include applications and/or data that can be utilized while computer processing is executed on servers that are remote from the client device 104. Web application 118 can also include services provided over the Internet and/or through a subscriber network, such as a cellular or Wi-Fi network.

The service provider system 102 may abstract resources and functions to connect the client device 104 with other computing devices. The service provider system 102 may also serve to abstract scaling of resources to provide a corresponding level of scale to encountered demand for the web application 118 that are implemented via the service provider system 102. Accordingly, in an interconnected device example, implementation of functionality described herein may be distributed throughout the system. For example, the functionality may be implemented in part on the client device 104 as well as via the service provider system 102 that abstracts the functionality of the network 108.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

generating, by a processing device, a request for an authorization token by a plugin executed within a sandboxed iframe of a web browser, the sandboxed iframe having a sandbox attribute that limits execution of the plugin within the sandboxed iframe of the web browser;

causing, by the processing device responsive to the request, display of a user interface (UI) output by an authorization provider module, the user interface configured to receive an input approving execution of the plugin;

communicating, by the processing device, the input approving execution of the plugin for receipt by a target authorization system, the input configured to cause the target authorization system to generate an authorization code for communication to the plugin as redirected via the authorization provider module, the plugin, the authorization provider module, and the target authorization system implemented separately, one to another, via a network;

receiving, by the processing device, the authorization code at the plugin as executed within the sandboxed iframe of the web browser, the authorization provider module configured to receive the authorization code from the target authorization system and redirect the authorization code to the plugin within the sandboxed iframe;

generating, by the processing device, a call to the target authorization system by the plugin as executed within the sandboxed iframe of the web browser, the call including the authorization code;

receiving, by the processing device, the authorization token by the plugin as executed within the sandboxed iframe of the web browser directly from the target authorization system in response to the target authorization system receiving the authorization code; and executing, by the processing device, the plugin using the authorization token within the sandboxed iframe of the web browser.

2. The method of claim 1, further comprising:

registering, by the processing device, the plugin; and retrieving, by the processing device, a client identifier via a plugin application programming interface of the plugin.

3. The method of claim 2, wherein the retrieving includes generating a user interface that is configured to receive an input authorizing execution of the plugin.

4. The method of claim 1, wherein the request specifies at least one of a network address of a target authorization system, an authorization type, a client identifier, a response type, a scope, and a challenger code.

5. The method of claim 1, wherein the generating of the request for the authorization token includes executing the plugin in the sandboxed iframe of the web browser based on the sandbox attribute as preventing autoplay or popups.

6. The method of claim 1, wherein the request is configured to cause a provider application programming interface (API) to pass the request to an authorization provider module, which causes the authorization provider module to load the user interface from a target authorization system specified in the request.

7. The method of claim 1, wherein the displaying of the UI includes displaying a pop-up window.

8. The method of claim 1, wherein the input received authorizing execution of the plugin includes credentials associated with a client identifier.

9. The method of claim 1, wherein the authorization code is received as a uniform resource locator parameter.

10. The method of claim 1, further comprising storing the authorization token locally as permitting continued execution of the plugin.

11. A system comprising:
a processing device; and
a computer-readable storage medium storing instructions that, responsive to execution by the processing device, causes the processing device to perform operations including:
receiving an input approving execution of a plugin, the input received via a user interface (UI);
communicating the input via a network for receipt by a target authorization system, the input configured to cause the target authorization system to generate an authorization code for communication to an authorization provider module, the plugin as executed within a sandboxed iframe of a web browser, the authorization provider module, and the target authorization system implemented separately, one to another, via the network;
receiving the authorization code at the plugin via the network from as redirected via the authorization provider module from the target authorization system, the plugin executed within the sandboxed iframe of the web browser, the sandboxed iframe having a sandbox attribute that limits execution of the plugin within the sandboxed iframe of the web browser;
generating a call via the network to the target authorization system by the plugin as executed within the sandboxed iframe of the web browser, the call including the authorization code;
receiving an authorization token by the plugin as executed within the sandboxed iframe of the web browser directly from the target authorization system via the network in response to the target authorization system receiving the authorization code; and
executing the plugin based on the authorization token within the sandboxed iframe of the web browser.

12. The system of claim 11, wherein the operations further include determining whether a user identifier associated with the plugin is already authorized by checking secure local storage.

13. The system of claim 11, wherein the operations further include generating a user interface that is configured to receive an input authorizing execution of the plugin.

14. The system of claim 11, wherein the authorization provider module is implemented as part of a software development kit.

15. The system of claim 11, wherein the operations further include communicating a request for receipt by the target authorization system, the request specifying at least one of a network address of a target authorization system, an authorization type, a client identifier, a response type, a scope, and a challenger code.

16. The system of claim 11, wherein the plugin is executed in the sandboxed iframe of the web browser based on the sandbox attribute as preventing autoplay or popups.

17. The system of claim 11, wherein the UI is displayed in a pop-up window.

18. The system of claim 11, wherein the input received authorizing execution of the plugin includes credentials associated with a client identifier.

19. The system of claim 11, wherein the authorization code is received by the plugin as a uniform resource locator parameter.

20. A non-transitory computer-readable storage medium storing executable instructions, which when executed by a processing device, cause the processing device to perform operations comprising:
registering, via a network, a plugin associated with a target authorization system using an authorization redirect application;
retrieving, via the network, a client identifier via a plugin application programming interface of an authorization provider module;
receiving, by the authorization provider module via the network, a request for an authorization token by the plugin executed within a sandboxed iframe of a web browser, the sandboxed iframe having a sandbox attribute that limits execution of the plugin within the sandboxed iframe of the web browser;
causing, in response to the request, display of a user interface received from a target authorization system by the authorization provider module, the user interface configured to receive an input approving execution of the plugin, the plugin, the authorization provider module, and the target authorization system implemented separately via the network;
communicating the input approving execution of the plugin within the sandboxed iframe of the web browser for receipt by the target authorization system, the input configured to cause the target authorization system to generate an authorization code for communication to the authorization provider module; and
sending the authorization code received from the target authorization system as redirected to the plugin executed within the sandboxed iframe of the web browser by the authorization provider module, the authorization code configured to enable receipt of an authorization token from the target authorization system by the plugin executed within the sandboxed iframe of the web browser in response to the target authorization system receiving the authorization code.

* * * * *